Figure 1:
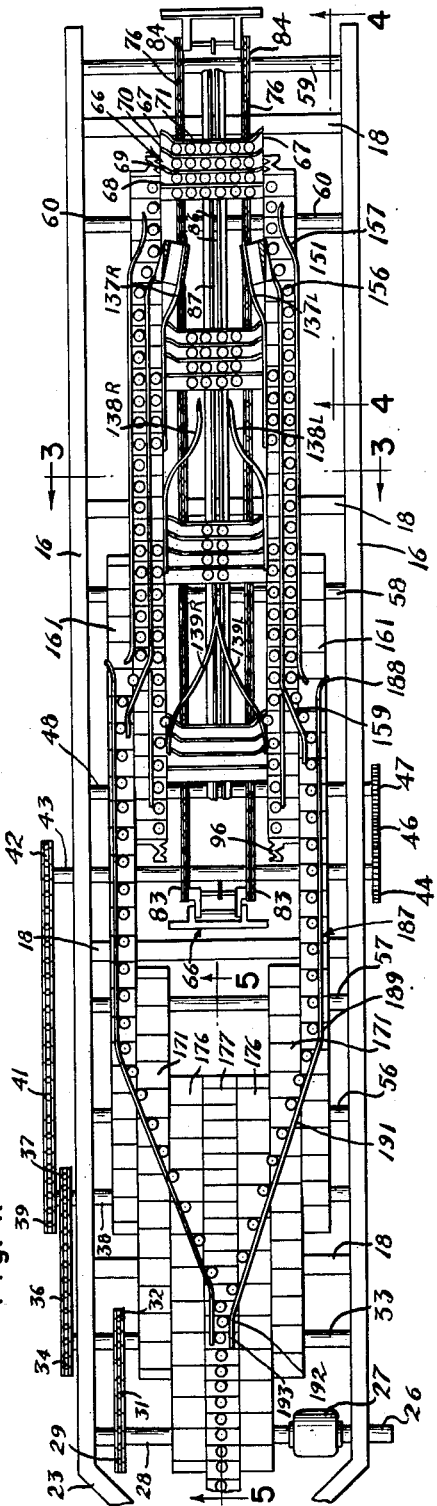

April 10, 1962  R. F. KRUPP ET AL  3,028,946
MACHINE FOR ARRANGING GLASS JARS
Filed Feb. 18, 1958  3 Sheets-Sheet 1

INVENTORS
Robert F. Krupp
BY Jan K. Wagner

Townsend and Townsend
Attorneys

April 10, 1962  R. F. KRUPP ET AL  3,028,946
MACHINE FOR ARRANGING GLASS JARS
Filed Feb. 18, 1958  3 Sheets-Sheet 2

INVENTORS
Robert F. Krupp
Jan K. Wagner
BY
Townsend and Townsend
Attorneys

April 10, 1962   R. F. KRUPP ET AL   3,028,946
MACHINE FOR ARRANGING GLASS JARS
Filed Feb. 18, 1958   3 Sheets-Sheet 3
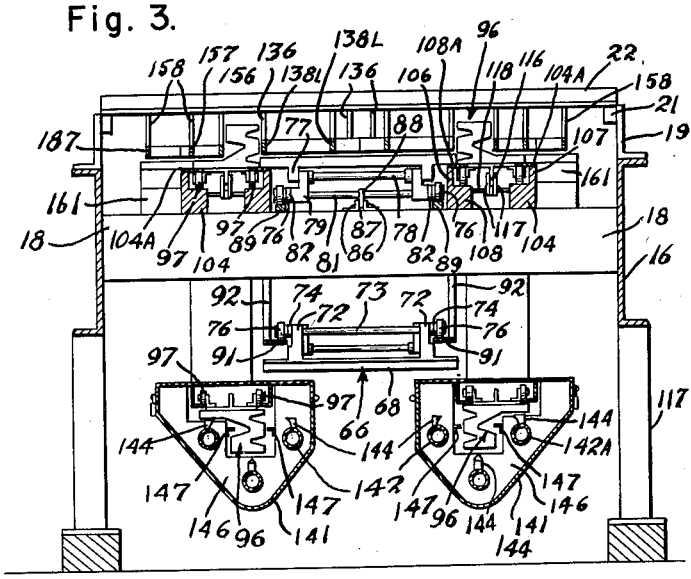
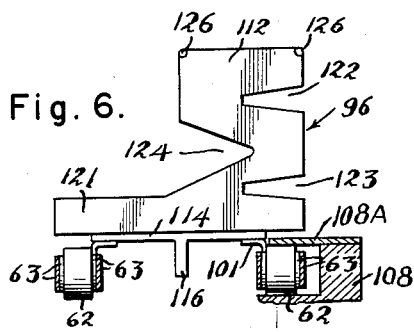
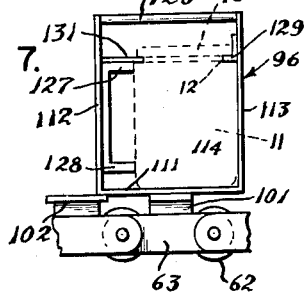
INVENTORS
Robert F. Krupp
Jan K. Wagner
BY Townsend and Townsend
attorneys United States Patent Office 3,028,946
Patented Apr. 10, 1962

3,028,946
MACHINE FOR ARRANGING GLASS JARS
Robert F. Krupp and Jan K. Wagner, Oakland, Calif., assignors to Gerber Products Company, Fremont, Mich., a corporation of Michigan
Filed Feb. 18, 1958, Ser. No. 715,960
19 Claims. (Cl. 198—32)

This invention relates to a new and improved machine for arranging glass jars in two columns, washing the jars and then converging the two columns into a single column. Reference is made to co-pending patent applications Ser. No. 519,318, now Patent No. 2,826,207 and Ser. No. 591,658, now Patent No. 2,865,490.

Customarily glass jars are shipped from the manufacturing plant in shipping cases packed in a regular pattern of rows and columns. Thus, conventional jars for infants' food and the like are usually shipped in shipping cartons containing twenty-four jars arranged in four rows of six jars each. By means such as that shown in co-pending application Ser. No. 500,546, now Patent No. 2,818,987 the jars are removed from the cartons in the same pattern in which they were packed.

The present invention relates to a machine which arranges the twenty-four jars in two columns of twelve jars each, then washes the jars and converges the two columns into a single column for filling and capping.

A particular feature and advantage of the invention is the fact that the apparatus provides means for handling jars rapidly and continuously without likelihood of jamming or crushing the jars. The mechanical means hereinafter set forth materially accelerates the speed at which container-packing plants may be operated. Handling the jars continuously is of particular importance in that, unless a steady supply of jars is received by the filling machine, its intermittent operation causes leakage, improper filling and generally unsatisfactory performance.

The absence of jamming or crushing containers is of particular importance when glass jars are employed, since production is delayed for a very long period of time when broken jars must be cleaned from the apparatus.

It will be understood that one of the features of this invention is the fact that the groove customarily formed in a jar below its open mouth is employed to hold the jar in position during the washing operation, as hereinafter appears.

Another feature of the invention is the fact that in their travel through the machine the jars are held in proper position out of contact with each other, thereby preventing damage to the finish of the open mouth of the jars. Contact of the jars with each other sometimes damages the finish, causing deleterious effects in that cracking may occur during subsequent heat-processing; leakage may occur after the closure is applied; or the consumer may believe that glass particles have entered the jars and been mixed with the contents.

In addition to there being no jar-to-jar contact, there is no metal contact with the finish of the jar, thereby eliminating a frequent cause of jar breakage.

A further feature of the invention is the fact that the containers are positively moved in a definite path and without contact with other containers, thereby reducing the damage and breakage of containers.

A further advantage of the invention is the fact that no screw, star wheel, mechanically actuated arm or other moving parts are employed, with the exception of moving conveyors. The use of screws, star wheels and moving arms is a source of trouble in that they sometimes impede the passage of containers or crush the same, particularly in the event of maladjustment as a result of operating wear or starting and stopping of the machine or the misshaped body of the jar between the finish and the base.

Other objects of the present invention will become apparent upon reading the following specification and referring to the accompanying drawings in which similar characters of reference represent corresponding parts in each of the several views.

Figure 5:
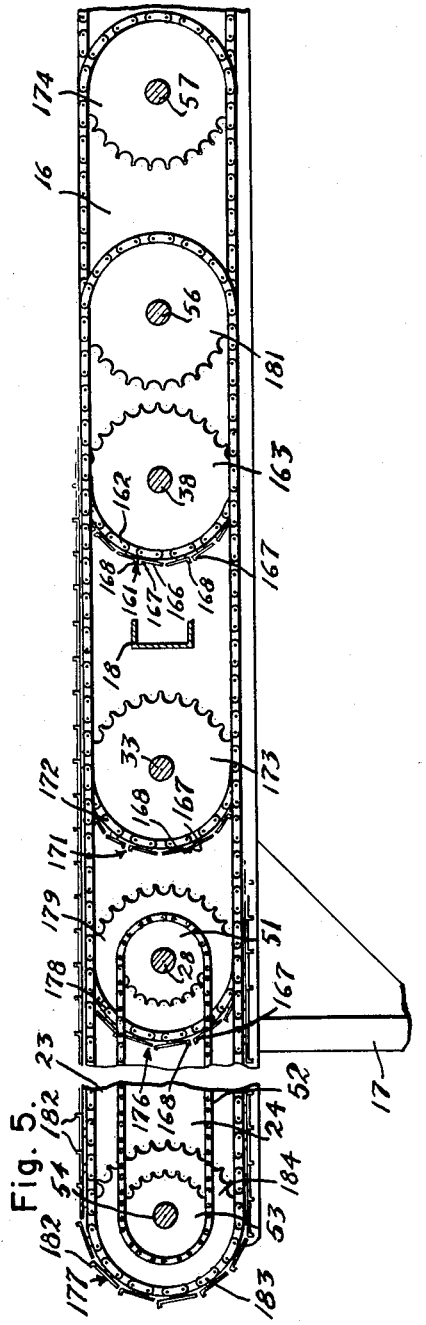
Figure 2:
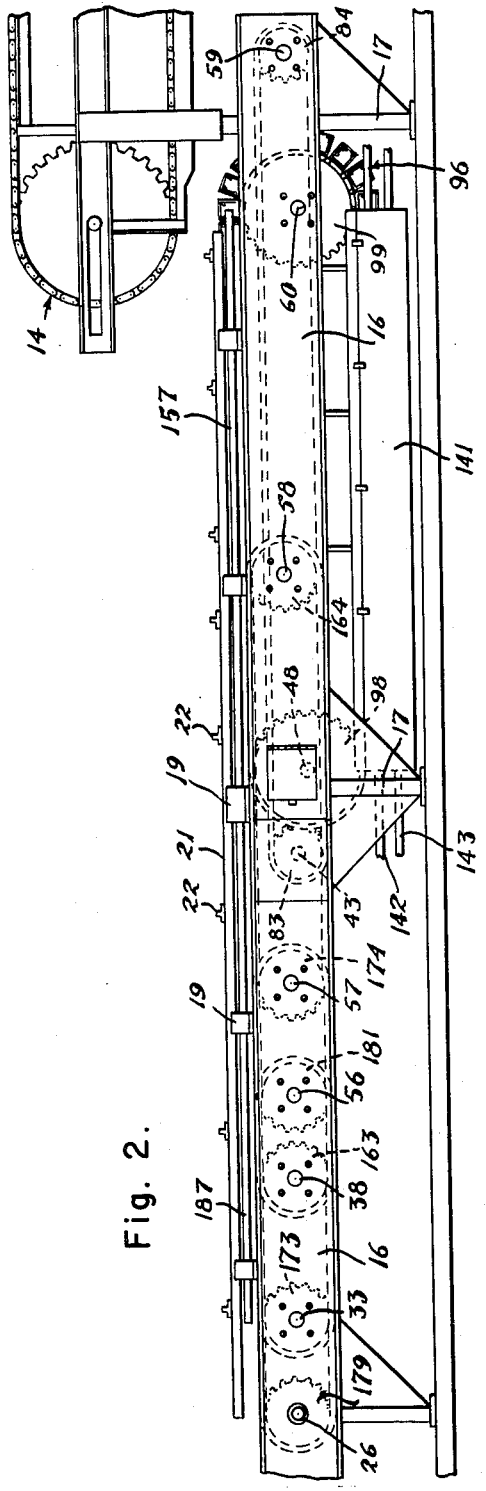
Figure 4:
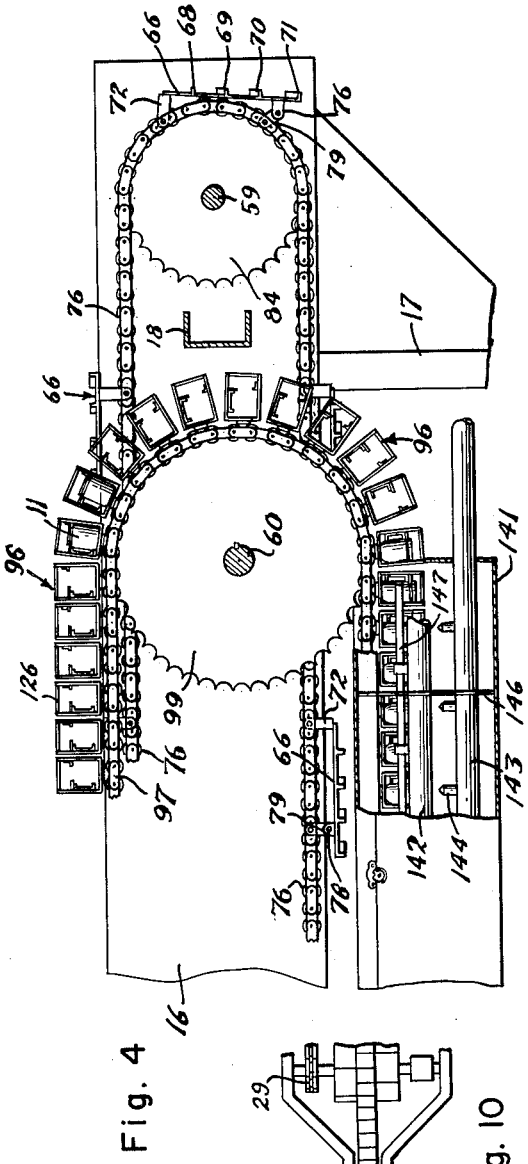
Figure 10:
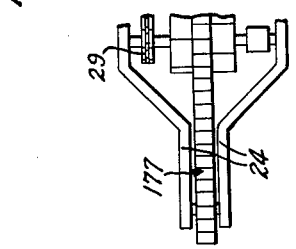

In the drawings:
FIG. 1 is a top plan of the machine;
FIG. 2 is a side elevation;
FIG. 3 is a vertical sectional view taken substantially along line 3—3 of FIG. 1;
FIG. 4 is a vertical sectional view taken substantially along line 4—4 of FIG. 1;
FIG. 5 is a fragmentary side elevation with certain parts removed to show the drive of the various conveyors;
FIG. 6 is a front elevation of a carrier used to hold the containers;
FIG. 7 is an end elevation of the carrier of FIG. 6;
FIG. 8 is a top plan of the carrier;
FIG. 9 is a fragmentary perspective view of a portion of the switching mechanism;
FIG. 10 is a fragmentary top plan showing a portion of the machine to the left of that shown in FIG. 1.

The present invention has particular application in the handling of small glass jars 11 such as those used to pack infants' food and the like. As manufactured, such jars are formed with an external groove 12 spaced downwardly a short distance from the open mouth 13 of the container. Such jars are conventionally received from the container-manufacturing plant in protective cartons wherein twenty-four jars are arranged in a pattern of four rows six jars wide. Expressed in other terms, six columns of four jars each are disposed in each shipping carton. As shown in fragmentary manner in FIG. 2, unloading apparatus 14 is provided for removing the jars from the shipping carton arranged in the same pattern of rows and columns as originally packed therein. Apparatus for such removal is disclosed in patent application Ser. No. 500,546.

*Frame and Drive*

The frame for the apparatus hereinafter described in detail is simple and rugged in construction. A pair of longitudinally extending shallow channel members 16 is disposed on each side of the machine, the channel members being turned on edge and held elevated from the floor by vertical legs 17. The channel members 16 are held in spaced parallel position by transverse tie-bars 18 located at spaced positions along the length of the channel members. At intervals along the length of the channel members are sections of angle bars 19 which comprise feet to which are connected longitudinally extending rails 21. The rails 21 support transversely extending inverted T-bars 22 from which depend the various switches and other parts of the machine hereinafter described in detail. At the forward end of the machine the sides converge in obliquely disposed frame portions 23 and the converging portions terminate in longitudinally extending forward side frames 24 parallel to channels 16, but spaced inwardly with respect thereto.

The entire machine is driven in timed relation to the operation of the unloader 14 and the filler machine (not shown) which is disposed beyond the present machine. The timing of these machines relative to each other forms no part of the present invention. A main shaft 26 is located at the extreme forward end of the channels 16, and a gear box 27 is located on main shaft 26 and connects to coaxial first drive shaft 28 journaled in channels 16, as well understood in the art. Thus, the rotational alignment of first drive shaft 28 relative to main shaft 26 may be changed from time to time as required through gear box 27. First drive shaft 28 carries a sprocket 29 which is connected by chain 31 to driven sprocket 32 on the second drive shaft 33, which likewise extends transversely of the machine and is journaled in two channels 16. Second drive shaft 33 carries a sprocket 34 connected by chain 36 to sprocket 37 on third drive shaft 38. Third drive shaft 38 carries a sprocket 39 connected by a chain 41 to sprocket 42 on fourth drive shaft 43. Fourth drive shaft 43 carries on one end a sprocket 44 which connects by chain 46 to sprocket 47 on fifth drive shaft 48. First drive shaft 28 likewise carries a second sprocket 51 which is connected by chain 52 to sprocket 53 on sixth drive shaft 54 at the extreme forward end of the machine. The six drive shafts heretofore mentioned drive the various conveyors, all as hereinafter described. For each of the first five drive shafts 28, 33, 38, 43, 48 there is a corresponding idler shaft 56, 57, 58, 59, 60, respectively, and sixth drive shaft 54 shares a common idler shaft 56 with first drive shaft 28.

Various conveyor drive chains hereafter mentioned comprise roller chains which pass around drive and idler sprockets on the various drive shafts and idler shafts. The chains are preferably formed with large-diameter rollers 62 (see FIG. 6) which are larger than the height of the links 63 between rollers. This construction makes it possible for the rollers to rest upon tracks and hence facilitates horizontally level movement of the various conveyors.

Pallets

A plurality of pallets 66 is employed to receive the twenty-four jars 11 deposited thereon at intervals by the unloader machine 14. The pallets 66 are flat, open-sided trays having slightly backswepth trailing side edges 67. Extending transversely of each pallet are raised dividers 68, 69, 70, 71. The foremost divider 68 extends straight across the pallet; the second divider 69 is slightly backswept at its side edges; the third divider 70 is slightly more backswept at its side edges than the second; and the fourth divider 71, which is disposed along the rear edge of the pallet 66, has its side edges swept backwardly at an angle of about 45°.

Depending from the forward end of the pallet 66 is a pair of legs 72. Transversely extending rod 73 passes through the lower end of legs 72 and carries on its outer ends blocks 74 which are fastened to links of pallet conveyor chains 76. Depending from the rearward end of pallets 66 are lugs 77 through which pass upper transverse rods 78 and from which depend links 79, through the lower ends of which pass lower transverse rods 81. The outer ends of lower transverse rods 81 carry blocks 82 which are fastened to links of pallet conveyor chains 76.

Pallet conveyor chains 76 are driven by drive sprockets 83 on fourth drive shaft 43 and pass around idler sprockets 84 on fifth shaft 59. The use of the two rods 77 and 81 on the rear end of the pallet 66 permits the pallet 66 to move around the sprockets 83 and 84 at either end of the travel of the pallet in substantially vertical position and without requiring an excessive amount of clearance room, thus permitting the tie-bars 18 to be located more closely to shafts 43 and 59 than would otherwise be the case.

Extending longitudinally of the machine, adjacent the center, there are trackways 86 fixed on the top surface of tie-bars 18, the trackways 86 having a slot 87 therebetween through which travels a guide 88 fixed to forward transverse rod 73. The guide 88 and trackways 86 prevent side sway of the pallets 66 and hold them in alignment as they move longitudinally of the machine.

Chains 76 on the upper stretch of the machine travel over longitudinally extending tracks 89 mounted on the top surfaces of tie-bars 18. On the lower stretch of travel of the conveyor, the rollers 62 on chains 76 rest on lower tracks 91 which are held depending from tie-bars 18 by means of legs 92.

Carriers

On either side of the path of travel of the pallets 66 is a plurality of carriers 96, and each carrier receives one of the jars 11 as it is switched off a pallet 66 by switches hereinafter described. Inasmuch as the carriers 96 on either side of the machine are substantially identical in construction, although reversed in position, only those on one side need be described herein. The carriers 96 are driven by means of a pair of chains 97 which travel over drive sprockets 98 on the fifth drive shaft 48 and idler sprockets 99 on the fifth idler shaft 60. Alternate links 101 of chain 97 are formed in the shape of angles, the upper flanges of which project inwardly, and the flanges are in turn fastened to the carriers 96. Alternate links 102 are formed with raised pads 103 on which the carriers rest and which assist in holding the carriers level. On the top stretch of the path of travel of the chains 97 are horizontally disposed inner and outer supports 104 and 108 upon which the rollers 62 of chains 97 rest as they are advanced directly beside the path of the pallets 66. Vertical spacers 107 and 106 project above supports 104 and 108, respectively, to form spacers for attaching plates 104A and 108A with a minimum of clearance above the rollers 62 of chains 97 but well below the bottom edge of the carriers 96. Plates 104A and 108A guard against carriers 96 tipping in the event that high lateral forces are applied on their extended upper edges. This construction provides for captive, rolling action for the carrier chains. The plates 104A and 108A, spacers 107 and 106 and supports 104 and 108 are held in elevated position by means of cross-ties 18.

Each of the carriers 96 is formed of sheet metal bent U-shaped in side elevation and has base 111 and front and rear ends 112 and 113. A strap 114, which is T-shaped in transverse vertical cross-section, is fixed to the bottom of the base 111 and the ends of the cross-arms of the T are fixed to the inwardly projecting flanged links 101 of carrier conveyor chains 97. The bottom edge of the leg 116 of the T-strap 114 is received within and guided by longitudinally extending track members 117 which are attached to supports 107 and 106 by rods 118 with a vertical slot therebetween to receive leg 116. In the upper horizontal longitudinal stretch of travel, chains 97 rest on the horizontal surface of stepped support legs 104 and 108.

The width of base 111 is slightly greater than twice the diameter of the jars 11 being handled. Each end at its inner side has a generally sigma shape in front elevation, as best shown in FIG. 6, with a low extension 121 extending to the outer edge of the base. The sigma shape is produced by upper and lower inner notches 122, 123 and by intermediate outer notch 124. The notches 122, 123, 124 permit entrance of the switches, all as hereinafter appears. For purpose of rigidity, the upper corners of the ends are joined by longitudinal tie rods 126.

The inner surface of the forward end 112 is provided with an upper and a lower spacer 127, 128 disposed parallel to the base 111. Rear end 113 is provided with a bar 129 disposed parallel to base 111 and spaced upwardly therefrom a distance exactly equal to the distance of the groove 12 in the jar 11 from the bottom of the jar. Similarly, upper spacer 127 is formed with a projection 131 opposite bar 129. Accordingly, as the jars are pushed into the carrier they are diverted rearwardly by beveled spacers 127, 128 and are held in place by extension 131 and bar 129 fitting into the groove 12 in jar 11. Bar 129 is optional according to the shape of the jar. Subsequently, when the carriers 96 are carried around to the lower stretch of their travel, extension 131 and optional bar 129 prevent the jar from dropping out of the carrier.

Switches

Associated with the pallets 66 are pairs of switches which are suspended from T's 22 by means of depending legs 136. The first set of switches 137L, 137R is disposed at the right end of the machine (as viewed in FIG. 1) and engage between the outermost columns and next outermost columns of jars 11 on pallets 66. The switches 137L, 137R curve outwardly and hence push the two outermost columns of jars off of the pallet 66 and into the carriers 96. The rearwardly swept dividers 68—71 on pallets 66 cooperate with the switches 137 to accomplish this movement. Spaced to the left of first switches 137 as viewed in FIG. 1, is a pair of second switches 138L, 138R, the right ends of which engage between the second and third columns and the fourth and fifth columns, and push the second and fifth columns off of the pallet 66 and onto carriers 96. The location of first switches and second switches relative to each other is such that the four jars in the second column move into carriers immediately behind the four jars in the first column, and the four jars in the fifth column move into carriers on the opposite side of the machine immediately behind the four jars in the sixth column. The third switches 139L, 139R are located to the left of the second switches 138 and come to a common point which enters between the third and fourth columns and divert those two columns of jars to the carriers 96 where they come into position immediately behind the four jars in the second column and the four jars in the fifth column, respectively. To accomplish this transfer in a smooth manner, the pallets 66 travel at the rate of two and three-quarters jars per unit of time, whereas the carriers 96 travel at the rate of three and three-quarters jars per unit of time, for a preferred embodiment of the invention handling infants' food jars. Pallets 66 are so spaced on chains 76 that the first and sixth columns of jars 11 of the second pallet enter carriers 96 immediately behind the third and fourth columns of jars from the first pallet.

*Washers*

The carriers 96 convey the jars down around sprockets 98 to the lower stretch of their travel where the carriers convey the jars in inverted position through casing 141 in which are pipes 142A, 142, 143 having jets 144, at intervals. The outer pipes 142 and 142A carry hot water which tempers the jars by being sprayed on the outside. The lower pipe 143 carries a hot rinse water, the jets being directed to spray the water through the inverted open mouths 13 of the jars. Suitable drains (not shown) are provided to convey away the waste water.

On the lower stretch of travel of the carriers, irregularly shaped cutout plates 146 are disposed inside the casing at intervals and support longitudinally extending angles 147 which engage the inner and outer edges of the jars held in the carriers and prevent the jars from slipping off the carriers. The plates 146 are cut out complementary to faces 112, 113.

When the carriers 96 travel back around sprockets 99 to the top stretch of their circuit, after having been rinsed and after having had an opportunity to drain, they are acted upon by shifters 151. Shifters 151 are mounted upon the outer surface of vertical leg 152 depending from horizontal member 153 attached to the T 22 farthest to the right, as viewed in FIG. 2. A second leg 154 depending from horizontal member 153 supports the right end of first switch 137. The elevation of shifters 151 is such that they fit into the top and bottom inner notches 122, 123 in the ends of carriers 96. Immediately behind shifters 151 is a curved fourth switch 156, which enters through outer notch 124 and completes the shift of the jars 11 from their position on the inner side of the carrier 96 to a position on the outer side of the carrier. Paralleling shifters 151 and fourth switch 156 is a curved outside guide rail 157 which prevents overshifting of the jars. Fourth switch 156 and guide rail 157 are likewise suspended from T's 22 by means of legs 158 and have extended longitudinal stretches. The left end 159 of the fourth switch 156 is bent outwardly to divert jars from outer position on carriers 96 to outermost conveyors 161. Guide rail 157 is similarly outwardly bent at its left end.

*Converger*

The outside conveyors 161 are driven from third drive shaft 38 by means of drive chains 162 which pass over drive sprockets 163 on third drive shaft 38 and idler sprockets 164 on third idler shaft 58. The speed of travel of outside conveyors 161 is preferably four and one-half jars per unit of time.

Outside conveyors are of a lugged platform type, in that in their horizontal top stretches they comprise horizontal platforms 166 having vertical lugs 167, 168 which engage behind the jars 11 and advance them. The platforms 166 are suitably mounted on links of outside conveyor chain 162 in a manner well understood in the art. Alternate platforms 166 are provided with lugs 167 or 168 at their rearward and forward ends, respectively, so that each jar 11 may be received between pairs of upstanding lugs 167, 168 in a space having a width equal to twice the width of the individual platform 166.

Partially overlapping and extending beyond the outside conveyors 161, and spaced immediately inwardly relative thereto, are intermediate conveyors 171 which are similar in construction to outside conveyors 161. Intermediate conveyors 171 are driven by intermediate roller chains 172 which pass over drive sprocket 173 on second drive shaft 33 and idler sprocket 174 on second idler shaft 57. The speed of travel of the intermediate conveyor 171 is preferably five and one-quarter jars per unit of time.

Partially overlapping and extending beyond the intermediate conveyors 171, and spaced immediately inwardly with respect thereto are inner conveyors 176 which are similar in construction to intermediate conveyors 171. A space separates the inner edges of the inner conveyors to provide room for the final conveyor 177 hereinafter described. Inner conveyors 176 are driven by inner conveyor chains 178, which pass over drive sprockets 179 on first drive shaft 28 and idler sprockets 181 on first idler shaft 56, respectively. The speed of travel of the inner conveyors 176 is preferably six jars per unit of time.

The three conveyors last mentioned, namely, the outer conveyor 161, intermediate conveyor 171 and inner conveyor 176, are duplicated on each side of the machine. However, the spacing of the lugs of the three conveyors on one side of the machine is preferably retarded one-half jar from the spacing of the lugs 167, 168 of the three corresponding conveyors on the other side of the machine. Hence, the final conveyor 177, which is driven at the same speed as the inner conveyors 176 but has twice as many lugs 182 as lugs 167 or 168 per unit of length, receives jars 11 alternately from one side of the machine and then the other, where they fit into position one behind the other in a single file and are propelled by lugs 182. Accordingly, final conveyor 177 is driven by final conveyor chain 183 advancing at the same speed as inner conveyor chain 179 and driven by drive sprocket 184 on sixth drive shaft 54 and idler sprocket 186 on first idler shaft 56, respectively.

Shifting of the jars from the various conveyors is accomplished by converger rails 187, one on each side of the machine. As viewed in FIG. 1, the converger rails come in at a point 188 along the outside edge of outer conveyor 161 and extending to the left to a point beyond second idler shaft 57, whereupon the converger rails are formed with an obtuse angular portion 189 and then extend in a substantially straight stretch 191 to a second obtuse angular section 192, and then in a short longitudinal stretch 193. Thus, the converger rails 187 hold the jars on the outer conveyors 161 as they advance in longitudinal direction and then progressively move them onto the intermediate conveyors 171, inner conveyors 176 and finally onto the final conveyor 177 in single file.

Although the foregoing invention has been described in some detail by way of illustration and example for purposes of clarity of understanding, it is understood that certain changes and modifications may be practiced within the spirit of the invention and scope of the appended claims.

What is claimed is:

1. A machine for handling containers, comprising a plurality of pallets arranged to receive a regularly shaped group of containers arranged in columns and rows on said pallets, means for advancing said pallets, a plurality of container carriers, each said carrier being shaped to receive a container, means for advancing said carriers in timed relation to said pallets in a circuit having a loading stretch along one side of the path of travel of said pallets, first switch means positioned to engage an outermost first column of containers on a pallet as said pallet is advanced to move said first column laterally off said pallet and into individual carriers, second switch means positioned to engage the second outermost column on said pallet next to said first column as said pallet is advanced to move said second column laterally off said pallet and into carriers behind the containers in said first column, means on each said carrier to hold a container in said carrier on an inverted stretch of the circuit of said carriers, an outermost conveyor, means for advancing said outermost conveyor in timed relation to said pallets along the side of the path of travel of said carriers opposite said pallets, carrier discharge switch means positioned to engage containers on said carriers as said carriers are advanced and move said containers laterally off said carriers and onto said outermost conveyor.

2. A machine according to claim 1, in which each said pallet is formed with a depending tongue and in which said machine further comprises a track shaped to receive said tongue and hold said pallet against lateral movement.

3. A machine according to claim 1, in which each said carrier is formed with a depending tongue and in which said machine further comprises track means to receive said tongue and restrain said carrier against lateral movement.

4. A machine according to claim 1, in which each said carrier has a width at least twice the width of a container and which further comprises third switch means positioned to engage containers and move said containers from a first position on the inside of said carrier to a second position on the outside of said carrier.

5. A machine according to claim 1, which further comprises a second set of container carriers on the side of said machine opposite said first-mentioned carriers, means for advancing said second carriers in timed relation to said pallet in a circlit having a loading stretch along a side of the path of travel of said pallet opposite said first-mentioned carriers, third and fourth switch means corresponding to said first and second switch means, respectively, to move the outermost and next outermost columns of containers, respectively, laterally off said pallet in a direction opposite to the direction of movement of said first and second switches and into said second carriers, a second outermost conveyor on the side of said machine opposite said first-mentioned outermost conveyor, and second carrier discharge switch means positioned to engage containers on said second carriers as said second carriers are advanced and to move said containers laterally off said second carriers and onto said second outermost conveyor.

6. A machine according to claim 5, in which said second outermost conveyor is retarded in position relative to said first-mentioned outermost conveyor by a distance substantially equal to one-half the width of a container.

7. A machine according to claim 5, which further comprises a first and a second intermediate conveyor spaced beyond the path of said pallet and inwardly of and adjacent said first-mentioned and second outermost conveyors, respectively, a first and a second inner conveyor spaced inwardly of and adjacent said intermediate conveyors, a final conveyor inwardly of said inner conveyors, means for driving said conveyors in timed relation to each other, all of said conveyors having substantially co-planar top stretches, and a first and a second converging guide rail on opposite sides of said machine and spaced above said co-planar surfaces of said conveyors, each said guide rail extending from the outer edge of one of said outermost conveyors to the outer edge of said final conveyor to move containers serially from an outermost conveyor to an intermediate conveyor, to an inner conveyor and thence to said final conveyor.

8. A machine according to claim 7, in which said final conveyor is advanced at substantially the same speed as said inner conveyors and is formed with lugs and in which said inner conveyors are formed with lugs, there being twice as many lugs on said final conveyor as on said inner conveyors.

9. In combination, a plurality of carriers each adapted to receive and retain a container of the type having a groove at one end, said carriers being U-shaped in side elevation and having a base and a pair of ends, said ends having protuberances to engage the groove in the container being held, means for advancing said carriers, and a first shifter stationarily mounted adjacent the inner edges of said carriers and positioned to engage a container held in said carriers and move said container laterally outwardly, said ends being formed with inner notches on their inner edges to provide clearance for said first shifter.

10. In combination, a plurality of carriers each adapted to receive and retain a container of the type having a groove at one end, said carriers being U-shaped in side elevation and having a base and a pair of ends, said ends having protuberances to engage the groove in the container being held, means for advancing said carriers, a first shifter stationarily mounted adjacent the inner edges of said carriers and positioned to engage a container held in said carriers and move said container laterally outwardly, said ends being formed with inner notches on their inner edges to provide clearance for said first shifter, and a second shifter stationarily mounted adjacent the outer edges of said carriers and positioned to engage a container held in said carriers after said container has been moved by said first shifter to further move said container laterally outwardly, said ends being formed with outer notches on their outer edges to provide clearance for said second shifter.

11. In combination, a plurality of carriers each adapted to receive and retain a container of the type having a groove at one end, said carriers being U-shaped in side elevation and having a base and a pair of ends, said ends having protuberances to engage the groove in the container being held, means for advancing said carriers, an upper and a lower first shifter stationarily mounted on the inner edges of said carriers and positioned to engage a container held in said carriers and move said container laterally outwardly, said ends being formed with upper and lower inner notches on their inner edges to provide clearance for said upper and lower shifters, and a second shifter stationarily mounted adjacent the path of travel of the outer edges of said carriers and positioned to engage a container held in said carrier after said container has been moved by said upper and lower first shifters to further move said container laterally outwardly, said ends being formed with outer notches on their outer edges to provide clearance for said second shifter.

12. In combination, in a converging apparatus, a first and a second outermost conveyor on opposite sides of the apparatus, means for depositing articles on each of said outermost conveyors, a first and a second intermediate conveyor spaced inwardly of and adjacent said outermost conveyors, a first and a second inner conveyor spaced inwardly of and adjacent said intermediate conveyors, a final conveyor inwardly of said inner conveyors, means for driving said conveyors in timed relation to each other, said intermediate conveyors being driven faster than said outer conveyors and said inner conveyors being driven faster than said intermediate conveyors, all of said conveyors having substantially co-planar top stretches, and a first and a second converging guide rail on opposite sides of the apparatus and spaced above the co-planar surfaces of said conveyors, each said guide rail extending from the outer edge of one of said outermost conveyors to the outer edge of said final conveyor and being positioned to move articles on said outermost conveyors inwardly and forwardly as said conveyors advance first to the adjacent intermediate conveyor, then to the adjacent inner conveyor and finally to said final conveyor.

13. The combination of claim 12, in which each said conveyor is formed with a plurality of platforms having lugs along one transverse edge, alternate platforms having lugs on opposite transverse edges.

14. The combination of claim 12, in which said final conveyor is advanced at substantially the same speed as said inner conveyors, each said conveyor having platforms and lugs along one transverse edge of said platforms, the number of lugs and platforms on said final conveyor being twice the number of platforms and lugs on each of said inner conveyors.

15. A carrier to convey containers of the type having a groove at one end, said carrier being U-shaped in side elevation and having a base and a pair of ends, said ends having protuberances to engage the groove in a container being held, at least one inner notch on the inner edges of said ends and at least one outer notch on the outer edges of said ends.

16. A carrier to convey containers of the type having a groove at one end, said carrier being U-shaped in side elevation and having a base and a pair of ends, said ends having protuberances to engage the groove in a container being held, a pair of inner notches on the inner edges of said ends and an outer notch on the outer edges of said ends.

17. A carrier according to claim 15, in which the distance between said ends is substantially greater than the diameter of a container being carried, and which further comprises spacers having beveled inner ends to direct a container toward the rearmost end.

18. A carrier according to claim 15, in which the width of each said carrier is substantially greater than twice the diameter of a container and in which said ends on the outermost side of said carriers are of materially lesser height than the ends on the inner sides of said carriers.

19. A carrier according to claim 17, which further comprises cross-ties tying together the upper corners of the inner sides of said carriers.

References Cited in the file of this patent
UNITED STATES PATENTS

| | | |
|---|---|---|
| 1,800,898 | Nelsen | Apr. 14, 1931 |
| 2,315,880 | Stiles | Apr. 6, 1943 |
| 2,379,789 | Cozzoli | July 3, 1945 |
| 2,756,553 | Ferguson | July 31, 1956 |
| 2,826,207 | Krupp | Mar. 11, 1958 |
| 2,865,490 | Krupp | Dec. 23, 1958 |